Dec. 8, 1964 B. C. MATHEWS 3,159,958
ROTARY CHOPPER FOR HAY AND LIKE CROPS
Filed Aug. 16, 1962 4 Sheets-Sheet 4

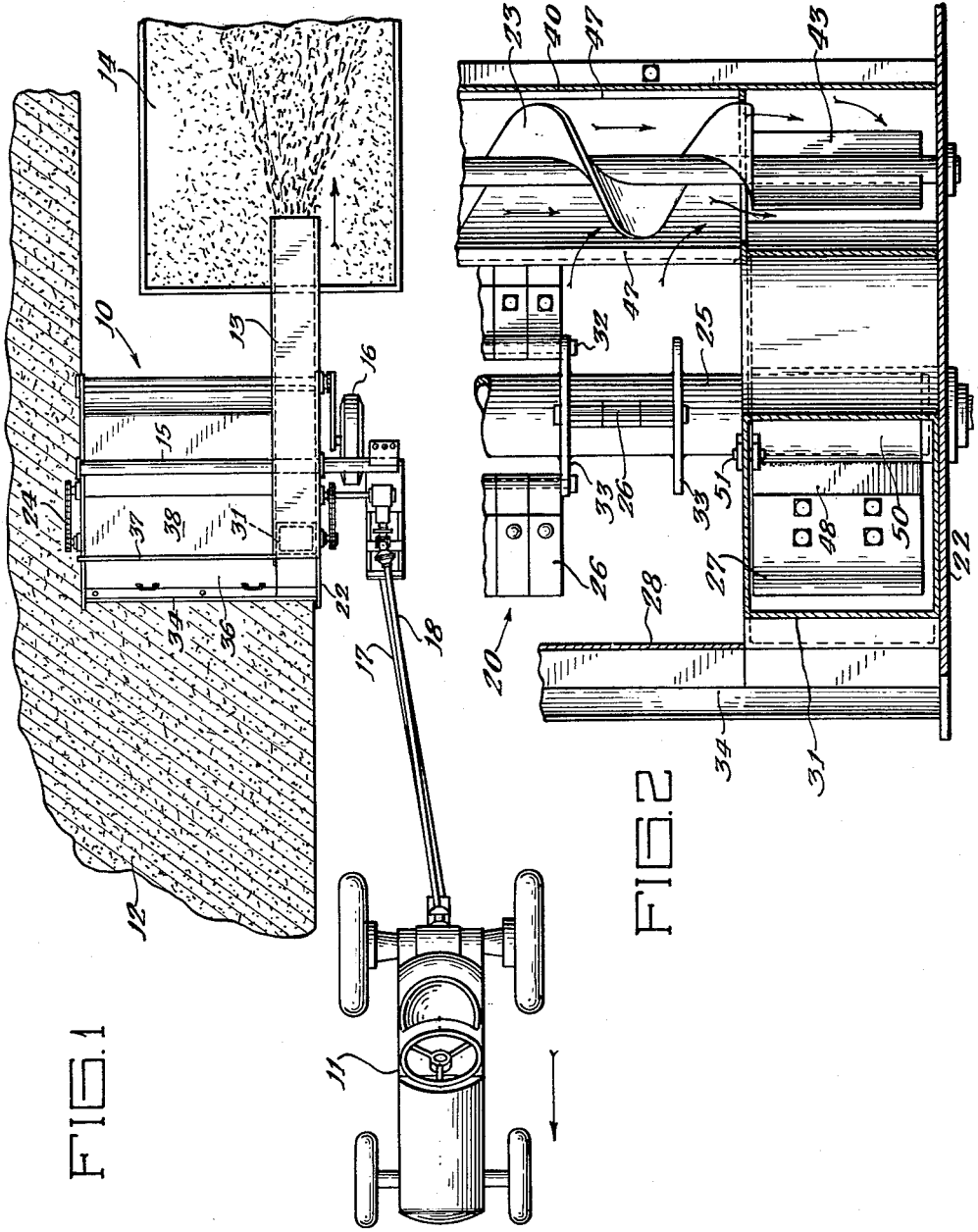

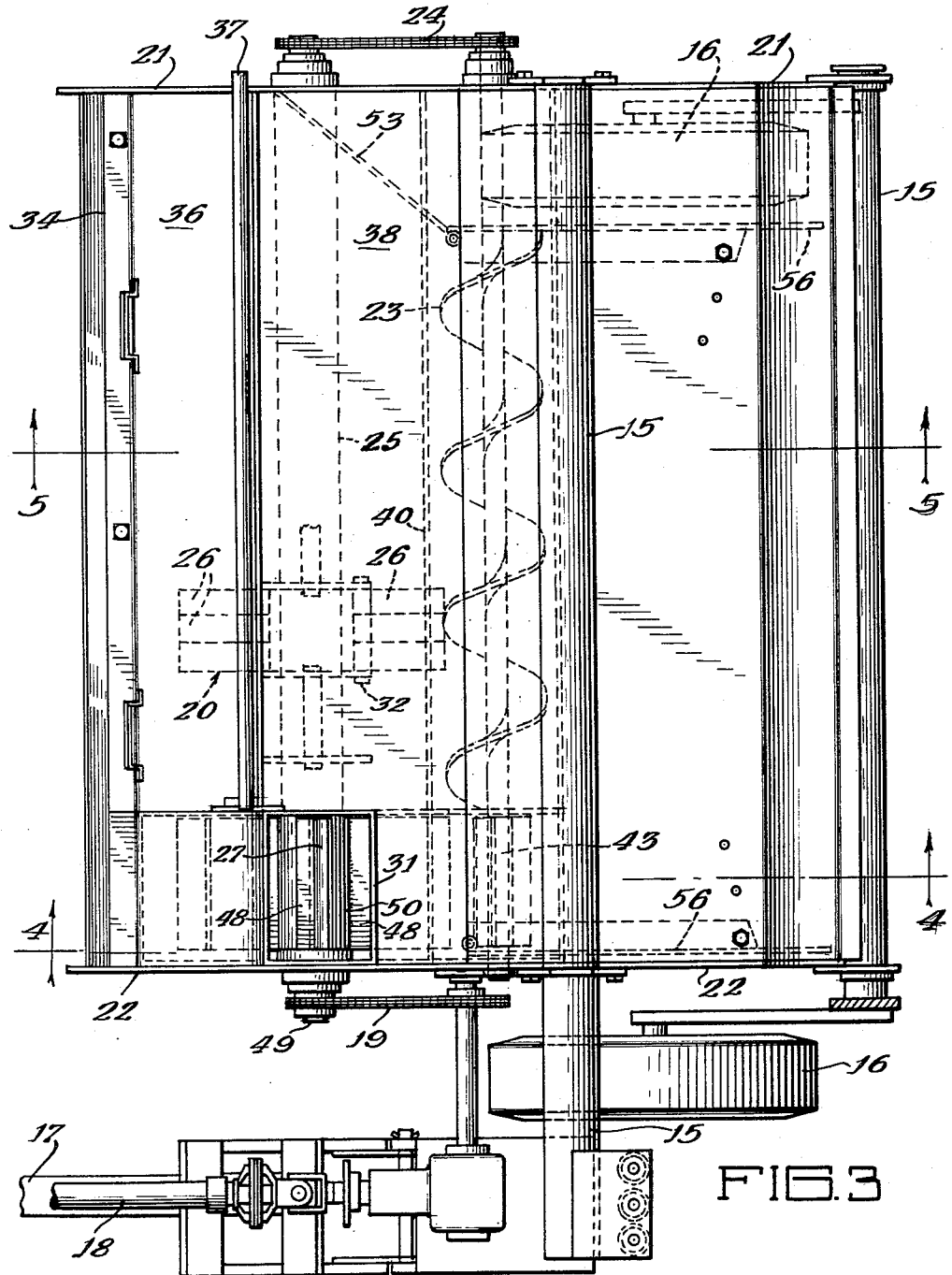

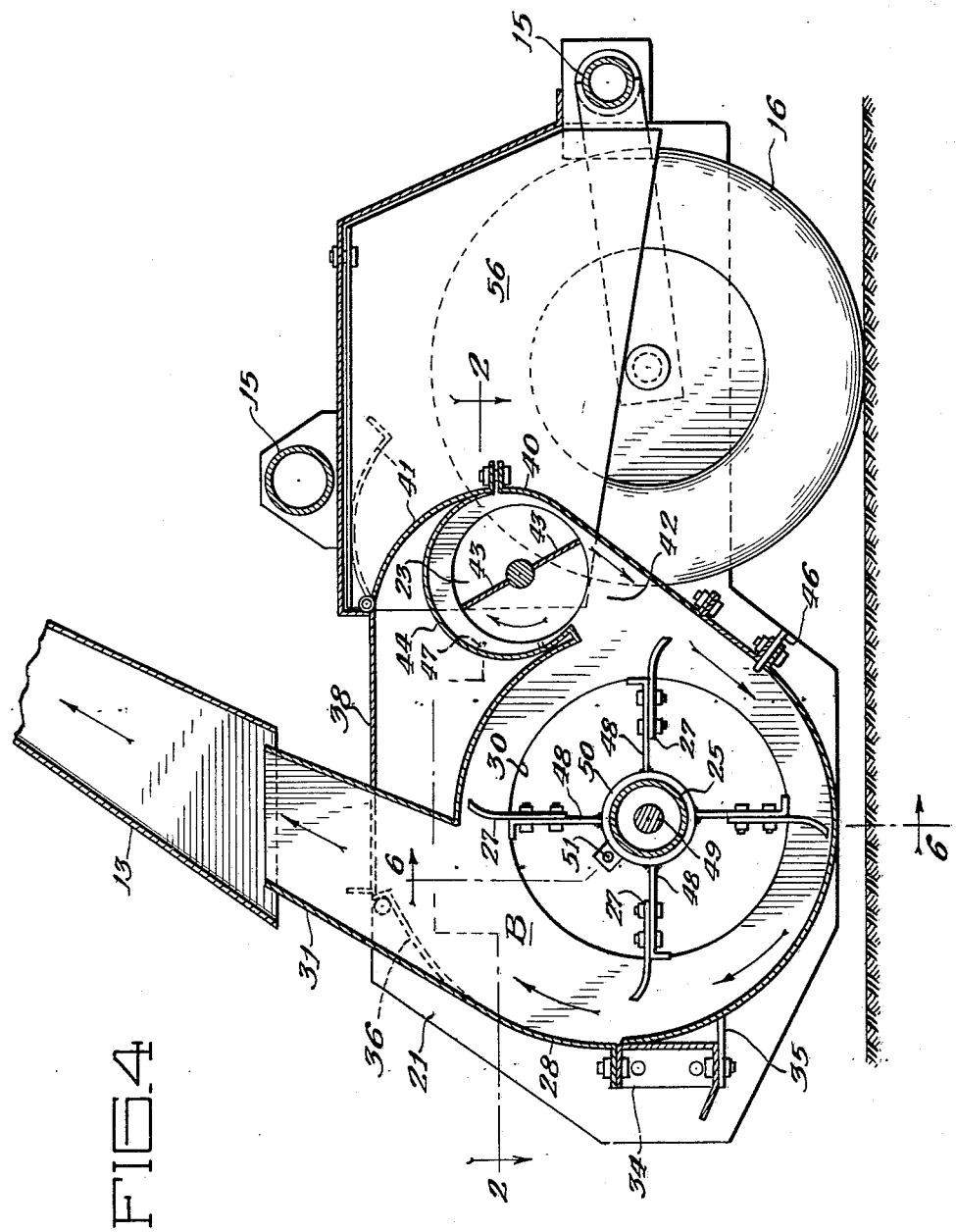

Inventor:
Bernard C. Mathews
By: Zabel, Baker, York,
Jones & Dithmar
Attorneys

3,159,958
ROTARY CHOPPER FOR HAY AND LIKE CROPS
Bernard C. Mathews, P.O. Box 202, Crystal Lake, Ill.
Filed Aug. 16, 1962, Ser. No. 217,459
10 Claims. (Cl. 56—24)

This invention relates to rotary choppers for use in chopping hay and like forage crops.

It is an object of my invention to provide an improved device for mowing crops and for chopping it up into fine particles and for delivering it to a wagon or other receptacle which is pulled behind the chopper.

In devices of this type, it is customary to use a flail type rotor which mows or picks up the crop and chops it into short lengths, and throws it rearwardly to a conveyor. The conveyor moves the chopped crop to a blower which in turn lifts or blows the chopped crop into a wagon.

One problem encountered in devices of this type is the loss of "fines." This type of device depends for its operation on imparting a certain momentum to the chopped particles so that they will be thrown rearwardly to the conveyor, thus bridging the gap between the rotor and the conveyor. However, in connection with the chopping, or mowing and chopping, there are numerous small particles, such as leaves, which do not have sufficient mass, or which, due to their shape and air resistance, cannot acquire sufficient momentum to bridge the gap between the rotor and the conveyor. As a result, the fines drop downwardly, or dribble, and sink into the stubble. As a result, the fines are not transferred to the wagon, and this is an economic loss, particularly since leaves are the most nourishing part of the crop.

It is an object of my invention to provide an improved chopper which overcomes the above problem of dribble, to the end that practically the entire crop can be transferred to the wagon.

According to my invention, the above objective is achieved by providing direct communication between the chopping zone and the blower so as to set up a strong draft through the blower which will pick up the fines and transfer them directly to the blower.

Another object of my invention is to provide a simplified chopper construction which includes only two rotating parts.

The commercial devices presently available generally utilize a conveyor in the form of an auger, and the arrangement is such that the rotor, the auger, and the blower are all mounted on separate shafts. The auger generally feeds into the side wall of the blower housing.

According to the present invention, the blower is mounted on the rotor shaft, thus eliminating one of the three shafts and its associated mounting means. Furthermore, according to my invention, the auger feeds into the end wall of the blower housing with the result that it is possible to provide an improved secondary chopping action which takes place in the blower.

A further object of my invention is to provide an improved arrangement in which the blower housing has two separate inlets, one being an axial inlet for receiving the fines, and the other being a radial inlet for receiving and further chopping the coarser particles.

Other objects are to provide an improved nonclogging auger arrangement and to provide a blower which is designed to avoid blade damage due to the picking up of stones, and to provide an arrangement which permits easy blade inspection and blade replacement.

Other objects, features and advantages will become apparent as the description proceeds.

With reference now to the drawings in which like reference numerals designate like parts;

FIG. 1 is a plan view showing my improved chopper and its relationship to a tractor which pulls it, the wagon which follows it, and the crop;

FIG. 2 is a horizontal section with parts broken away taken along the line 2—2 of FIG. 4;

FIG. 3 is an enlarged plan view of the chopper alone;

FIG. 4 is an enlarged vertical section taken along line 4—4 of FIG. 3, showing the blower;

Figure 5:
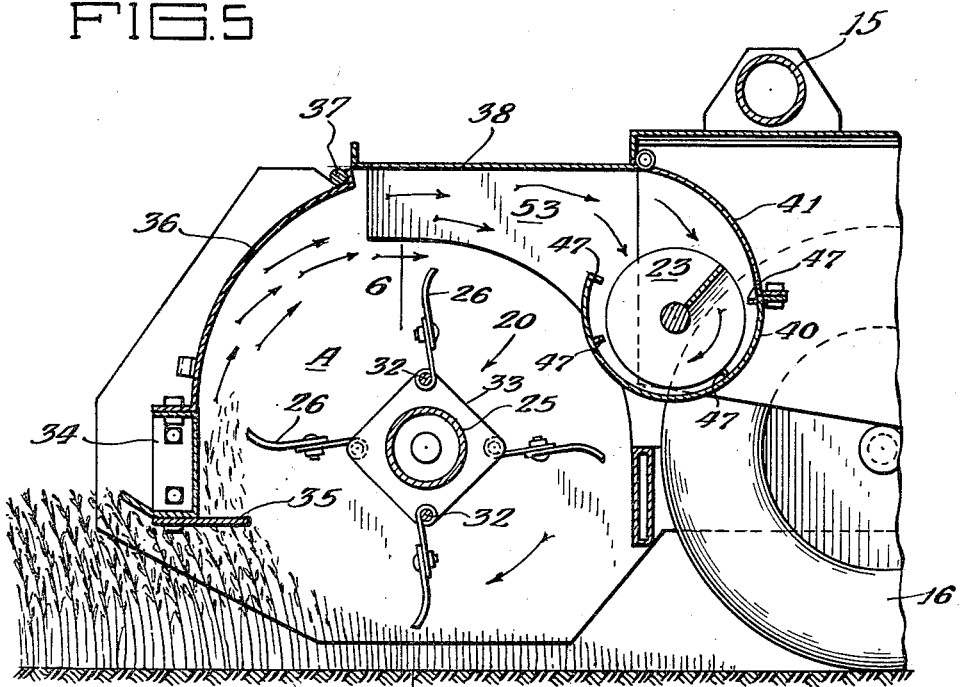
Figure 6:
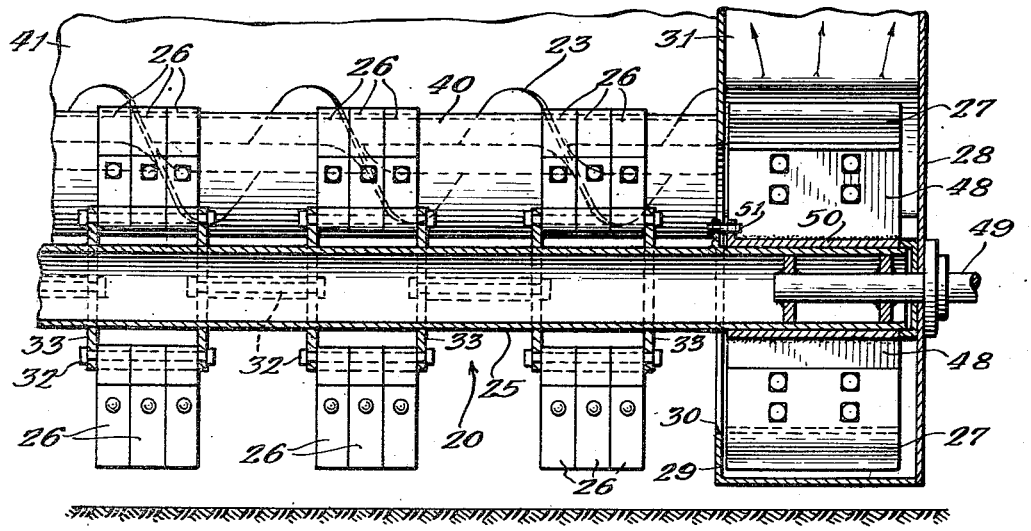

FIG. 5 is an enlarged vertical section with parts broken away taken along line 5—5 of FIG. 3 showing the rotor assembly; and FIG. 6 is a vertical transverse section showing the rotor assembly and blower taken along line 6—6 of FIGS. 4 and 5.

In FIG. 1, the chopper 10 is pulled by a tractor 11 in an offset relationship through the crop 12. A duct 13 extends between the chopper 10 and a wagon 14 which is coupled to the chopper by suitable means, not shown.

The chopper 10 comprises a suitable frame 15 which is mounted on two wheels 16 and which includes a rigidly connected draw bar 17 which is attached to the tractor 11. A drive shaft 18 also extends from the usual power take-off of the tractor 11 to the chopper 10, and drives a rotor assembly 20 through suitable gearing and a sprocket chain 19.

The rotor assembly is journalled in side walls 21 and 22 which preferably are structural members made of steel plate. Also journalled in the side walls is an auger 23 which is driven at one end by a sprocket chain 24 from the rotor assembly 20.

The rotor assembly 20 includes a tubular member 25 which carries a plurality of pivoted blades or swingles 26. One end of the rotor assembly, the right end when viewed from the front, as in FIG. 6, is provided with four or more rigid blades 27, referred to herein as the blower blades. A blower housing 28 surrounds the blower blades 27 and provides a blower chamber B shown in FIG. 4. The blower housing 28 includes a vertical wall 29 which has a circular opening 30, thus providing an axial inlet for the blower chamber B. The blower housing is also provided with an outlet spout 31 which communicates with the duct 13.

The swingles or blades 26 are mounted on the tubular member 25 by means of a plurality of bolts 32 which extend between plates 33, as shown in FIGS. 5 and 6. The swingles are preferably mounted in groups of three, and adjacent groups are offset from each other by 90°. Preferably, two groups of swingles are mounted on the tubular member 25 at any given point, these being located 180° apart, although a single or a treble row arrangement may be used, instead of the double row arrangement herein shown, according to the speed at which it is desired to drive the rotor assembly 20.

The frame 15 of the machine also includes a front frame member 34, shown in FIGS. 4 and 5 which carries on its lower flange an adjustably mounted shear blade 35. This cooperates with the blades of the swingles 26 to provide a chopping action as the chopper 10 is advanced through the crop 12, thus, successively cutting off the stems of the plant in two or three inch lengths.

Each swingle 26 may be either a two piece element as shown, which permits replacement of the cutting edge without removal of the bolts 32, or a unitary element. In the alternative, a single blade providing a single cutting edge may be mounted on each group of three swingles, but the present arrangement of three independently mounted swingles is preferred from the viewpoint of minimizing possible blade damage due to rocks.

A front cover 36 is pivotally mounted by means of a hinge rod 37 to a structural wall 38, as shown in FIGS. 3 and 5. This permits the cover or front wall 36 to be elevated for purposes of blade inspection or blade replacement.

The front wall 36, the top wall 38, the side wall 21, and the blower housing wall 29 cooperate to provide a housing for the flail portion of the rotor assembly 20 which housing defines a chopping zone A, identified in FIG. 5. Thus, rotation of the rotor assembly will set up a strong draft which moves in the axial direction of the rotor assembly from the chopping zone A into the blower chamber B, and upwardly through the duct 13 into the wagon 14. This draft has been found to be very effective in recovery of the fines which would otherwise be lost through dribble.

Disposed rearwardly of the rotor assembly 20 is a trough 40 in which the auger 23 is located. A deflector 41 which extends between the top wall 38 and the rear wall of the trough 40 provides a path whereby the chopped crop is transferred from the chopping zone A to the conveyor or auger 23, so that it may moved to the right end of the machine, toward the blower chamber B.

As shown in FIGS. 2 and 4, the lead end, or right end, of the trough 40 is provided with a downwardly extending opening 42 which communicates with the blower chamber B, to provide a second inlet therefor. The lead end of the auger 23 preferably terminates in a pair of paddles 43 which facilitate the movement of the chopped crop from the trough 40 into the blower chamber B. At this point, also, a cover 44 is provided above the second inlet 42 and above the paddles 43 to assist in the feeding operation.

In operation, the chopped crop is thrown by the swingles 26 rearwardly into the trough 40, from which it is conveyed to the lead end of the auger 23 and fed through the second inlet 42 into the blower chamber B, from which, in turn, it is blown and thrown upwardly through the outlet 31 into the duct 13. It is desirable that a second stage of chopping be provided, and to this end, one or more shear blades 46 are located in the wall of the blower housing 28.

Shear blades 47, disposed in the trough 40, serve to cut any particularly long or unchopped stems which might be thrown into the trough 40, and which would otherwise tend to become wrapped around the auger 23 and might clog the same.

Thus, the coarser particles are fed from the primary chopping zone A to the blower chamber B by means of the conveyor or auger 23, whereas the fines are transferred directly to the blower chamber B through the first inlet opening 30. Due to the fact that the second inlet opening 42 is a radially disposed opening, a much more effective secondary chopping action is provided because the plants are engaged by the outermost ends of the blades 27, which are the blade parts having the greatest linear speed, and the tips of these blades cooperate with the shear blade 46, which also may be adjustably mounted, in order to provide an efficient secondary chopping step. It will be observed that the rigid blades 27 may be removably mounted on radially extending plates 48 by means of suitable bolts, and the ends of the blades 27 may be appropriately curved and sharpened to provide the desired chopping action.

The secondary chopping action may be regulated as to fineness or coarseness by adding or removing blower blades 27. For example, the tubular member 25 may be provided with as many as twelve radially extending plates 48, thus providing considerable latitude in the degree of regulation obtainable. In such an event, the number of blower blades 27 selected could be 2, 3, 4, 6, or 12 without destroying dynamic balance.

The tubular member 25 is secured to stub shafts 49 which extend through the side walls 21 and 22, one of which is shown in FIG. 6. The radial plates 48 are mounted on a sleeve 50 which surrounds the tubular member 25, and the driving connection between the elements 25 and 50, is effected by a shear pin 51, shown in FIGS. 4 and 6. Due to this arrangement, if a rock is picked up by the swingles 26 and thrown into the auger trough 40 and advanced by the auger 23 into the blower chamber B, where it would tend to jam between a blade 27 and the shear blade 46, damage to the mechanism will be avoided by the rupture of the shear pin 51. A shear pin (not shown) also is preferably provided between the auger 23 and its drive mechanism 24. The advantage of the flail type chopper, of course, is that the individual swingles will yield when a rock is struck, thus avoiding jamming of the rotor assembly 20.

As shown in FIGS. 3 and 5, a sloping side wall 53 extends between the left end of the auger trough 40 and the side wall 21, due to the fact that the auger trough 40 terminates somewhat short of the side wall 21 in order to avoid interference with the left wheel 16.

In the event that it is desired to return the chopped forage to the ground, the deflector 41 is hingedly mounted so that it may be raised into the dotted line position shown in FIG. 4, thus by-passing the auger 23 and the secondary chopping step. The position of the deflector 41 can be controlled by a suitable handle, not shown. In order that the primary chopped forage may be deposited in a windrow of controlled width and depth, hingedly mounted wings 56 may be provided together with means for locking them in adjusted position.

According to this mode of operation, the chopped forage is dried on the ground, and coarser pieces are preferred. The shear blade 35 may be opened up, or removed entirely, to reduce the extent of chopping. Also, at this time, it is preferred to disconnect the auger, by removing the sprocket chain 24, and to disconnect the blower by removing the shear pin 51 so that the fines will drop to the ground.

Although only a preferred embodiment of my invention has been shown and described herein, it will be understood that various modifications and changes may be made in the construction shown without departing from the spirit of my invention as pointed out in the appended claims.

I claim:

1. A rotary chopper comprising a rotor assembly including a rotor shaft and pivotally mounted blades, first housing means surrounding the upper front portion of said blades to define a chopping zone, a blower mounted at one end of said rotor assembly and including a blower housing, conveyor means located rearwardly of said rotor assembly for transferring chopped material from said chopping zone to said blower housing, said blower housing having a side wall separating said blower from said chopping zone, said rotor shaft extending through said side wall, said side wall having an inlet opening surrounding said rotor shaft and concentric therewith and communicating directly with said chopping zone whereby the operation of said blower will create a draft within said chopping zone for blowing fines from said chopping zone through said inlet opening and directly into said blower housing, and outlet means for said blower housing.

2. A chopper for hay or the like comprising a frame including side walls, a rotor journalled in said side walls, housing means enclosing the upper front portion of said rotor assembly to define a chopping zone, a plurality of swingles mounted on said rotor assembly in said chopping zone, a shear blade mounted on said frame for cooperation with said swingles, an auger trough located rearwardly of said rotor assembly, deflector means providing a path extending from the upper portion of said housing to said auger trough, an auger disposed in said auger trough, a blower mounted at one end of said rotor assembly, and a blower housing including a side wall having a first inlet opening communicating with said first mentioned housing means, and including a second inlet opening communicating with the lead end of said trough whereby chopped material of substantial mass will be transferred from said chopping zone to said blower housing by means of said auger, and whereby chopped material of insignificant mass will be transferred from said chopping zone to said blower housing through said first inlet opening.

3. A chopper as claimed in claim 2 in which said first inlet opening is an axially disposed inlet, and in which said second inlet opening is a radially disposed inlet formed in the periphery of said blower housing, a second shear blade mounted in the peripheral wall of said blower housing, said blower including blower blades which cooperate with said second shear blade to provide a secondary chopping step on the chopped material of substantial mass which passes through said second inlet opening.

4. A chopper as claimed in claim 3 which includes a radially disposed shear blade mounted in the wall of said auger trough.

5. A rotary chopper for hay and like crops including a rotor assembly mounted on a horizontal axis, said rotor assembly including a plurality of swingles extending throughout the major portion of the length thereof, and blower blades mounted at one end thereof, an auger trough located behind and above said rotor assembly, an auger disposed in said auger trough, housing means enclosing the upper front portion of said rotor assembly to define a chopping zone, a blower housing enclosing said blower blades and including a wall separating said blower blades and said chopping zone, an opening in said wall providing a first blower inlet for said blower housing, said auger trough communicating with said chopping zone and having an opening at one end communicating with said blower housing to provide a second blower inlet, and outlet means for said blower housing, whereby crop chopped by said swingles will be transferred to said auger trough and caused by said auger to pass into said blower housing through said second blower inlet, and fine plant material which is not so transferred to said auger trough will be blown through said first blower inlet from said chopping zone into said blower housing.

6. A rotary chopper as claimed in claim 5 in which said second blower inlet extends downwardly from said auger trough to said blower housing.

7. A rotary chopper as claimed in claim 6 in which the lead end of said auger is provided with paddles located above said second blower inlet.

8. A rotary chopper as claimed in claim 5 which includes a hingedly mounted deflector extending from said choping zone to said auger trough and located above said auger.

9. A rotary chopper as claimed in claim 5 in which said housing means includes a hingedly mounted front cover which extends for the full width of said rotor assembly.

10. In a rotary chopper for hay and the like having a rotor assembly including crop cutting blades and housing means therefor to define a chopping zone, the combination of a blower mounted at one end of said rotor assembly and forming a part thereof, conveyor means located rearwardly of said rotor assembly for transferring chopped material from said chopping zone to said blower, means providing direct communication in an axial direction between said chopping zone and said blower, said rotor assembly including a shaft, and said blower comprising a sleeve surrounding said shaft at one end thereof, radially extending blower blades secured to said sleeve, and means including a shear pin providing a driving connection between said shaft and said sleeve.

References Cited by the Examiner
UNITED STATES PATENTS

| 2,871,643 | 2/59 | McClellan | 56—24 |
| 2,947,129 | 8/60 | Kowalik | 56—24 X |
| 2,965,320 | 12/60 | Pierson | 56—26 X |

T. GRAHAM CRAVER, *Primary Examiner.*

RUSSELL R. KINSEY, *Examiner.*